No. 749,941. PATENTED JAN. 19, 1904.
A. F. MUELLER.
AMUSEMENT APPARATUS.
APPLICATION FILED OCT. 9, 1902. RENEWED OCT. 5, 1903.
NO MODEL. 3 SHEETS—SHEET 3.

WITNESSES:

INVENTOR.
A. F. Mueller.
ATTORNEY

No. 749,941. Patented January 19, 1904.

UNITED STATES PATENT OFFICE.

ALFRED F. MUELLER, OF PHILADELPHIA, PENNSYLVANIA.

AMUSEMENT APPARATUS.

SPECIFICATION forming part of Letters Patent No. 749,941, dated January 19, 1904.

Application filed October 9, 1902. Renewed October 5, 1903. Serial No. 175,894. (No model.)

*To all whom it may concern:*

Be it known that I, ALFRED F. MUELLER, a subject of the Emperor of Germany, residing at Philadelphia, in the county of Philadelphia and State of Pennsylvania, have invented certain new and useful Improvements in Amusement Apparatus, of which the following is a description, reference being had to the accompanying drawings, forming part hereof.

It is one object of the present invention to provide an apparatus for affording amusement and pleasure wherein one portion of the apparatus may be used for the purpose of the well-known merry-go-round or carousel and whereof in the other portion boats may be caused to travel in a circular path consisting of an artificial body of water and an inclined and undulating trackway.

A further object of the invention is to provide mechanism for operating the respective portions of the apparatus.

A still further object of the invention is to provide means whereby when the boats are going up an incline they shall remain in substantially horizontal position in respect to the incline.

Other objects of the invention will hereinafter appear.

The invention consists of the improvements hereinafter set forth and claimed.

The nature, characteristic features, and scope of the invention will be more fully understood from the following description, taken in connection with the accompanying drawings, forming part hereof, and in which—

Figure 1:
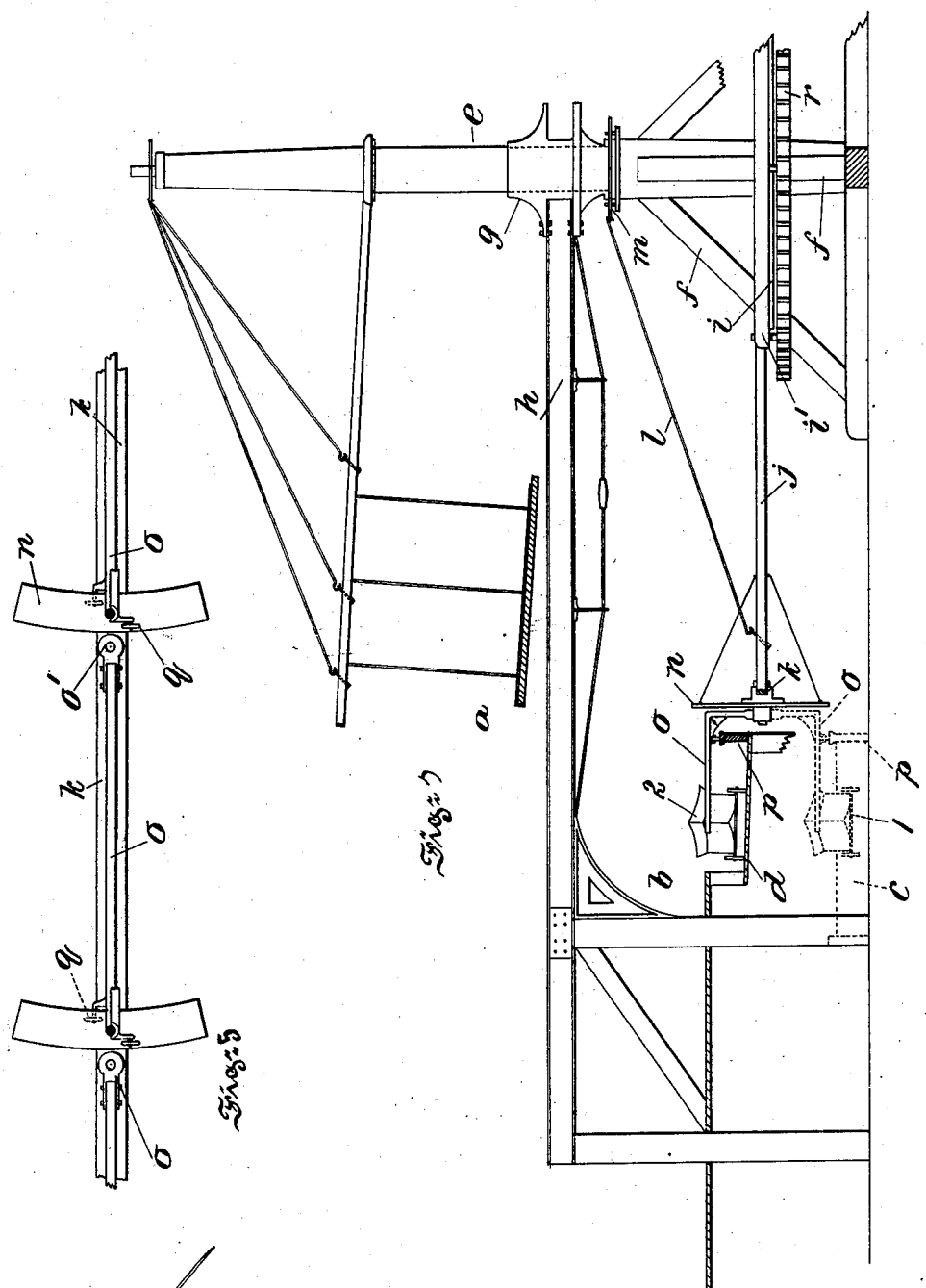
Figure 2:
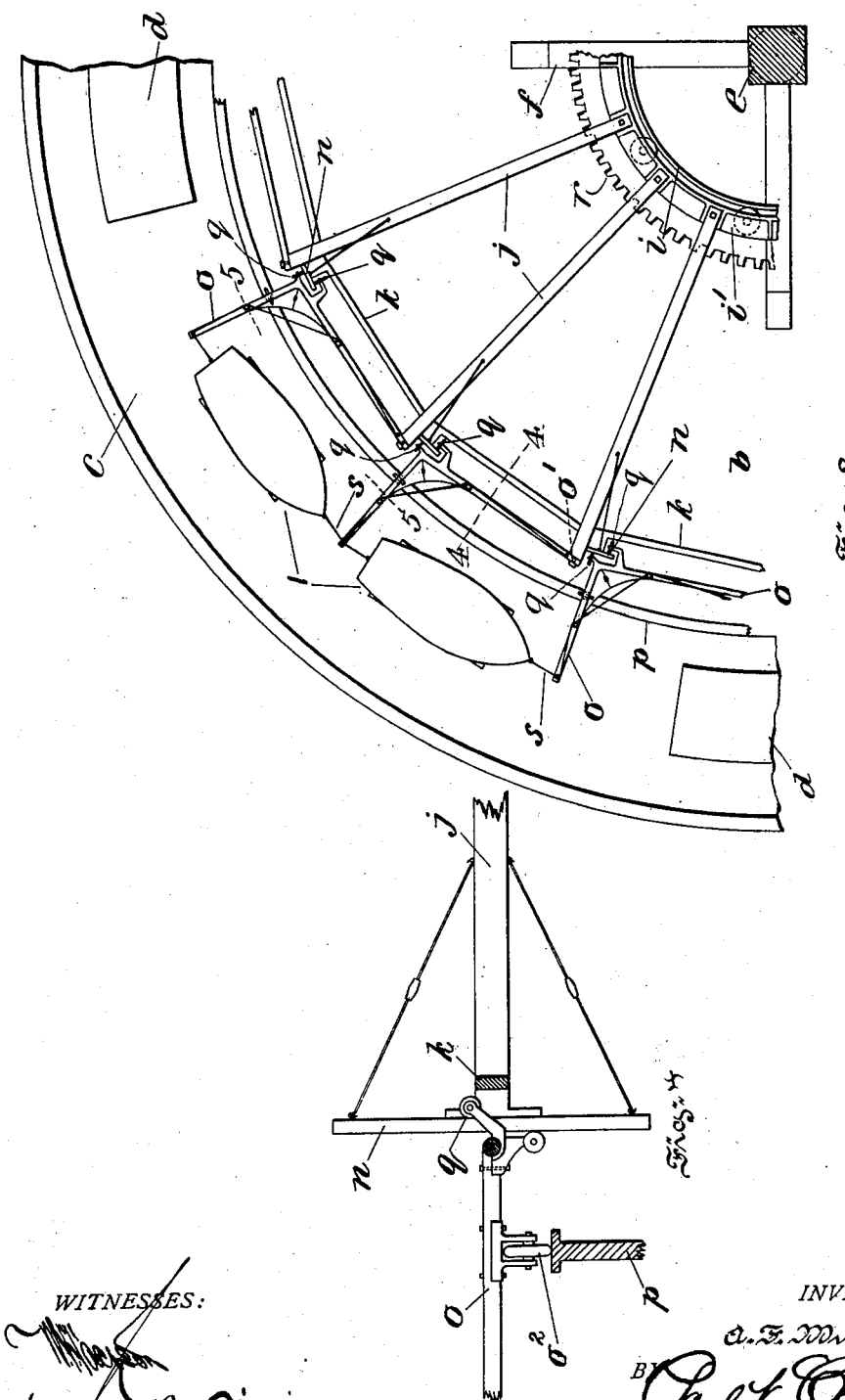
Figure 3:
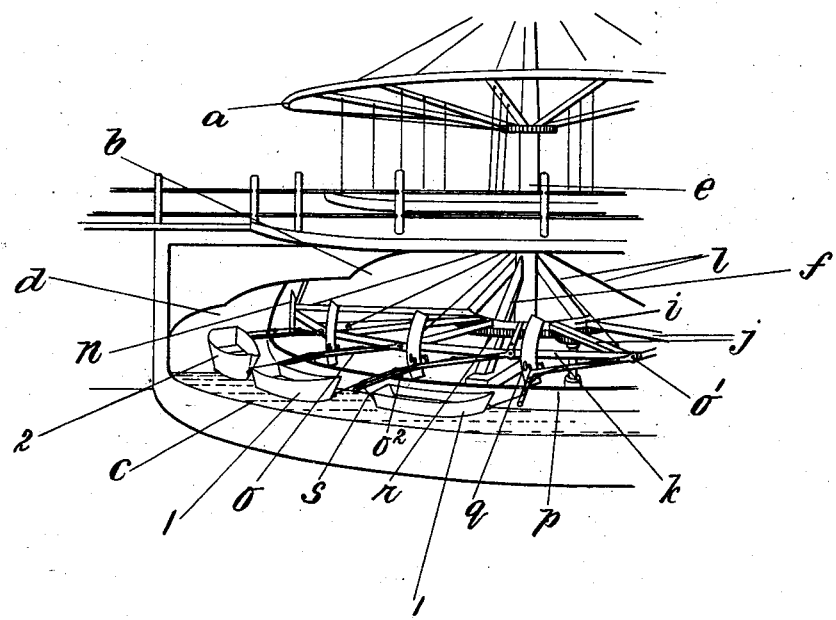

Figure 1 is an elevational view, principally in section, of a portion of the amusement apparatus embodying the invention. Fig. 2 is a sectional plan view of Fig. 1. Fig. 3 is a perspective view of a portion of the apparatus shown in Figs. 1 and 2. Fig. 4 is an enlarged view of detail construction, taken approximately on the line 4 4 of Fig. 2. Fig. 5 is an enlarged view of detail construction, taken approximately on the line 5 5 of Fig. 2.

Referring to the drawings, $a$ illustrates the portion of the apparatus that is utilized as a carousel, the animals being omitted in the present instance.

$b$ is the portion constructed beneath the carousel and comprises a circular course, of which a portion is water contained in the channel $c$ and of which the other may comprise an inclined and undulating trackway $d$.

$e$ is the center pole, the operating mechanism of which is not shown in the drawings, the same being well known in the art. The center pole is suitably supported by beams $f$ and is provided with a stationary collar $g$, to which the girders $h$ are bolted at one of their ends and are suitably supported by beams and braces at their other extremities. This construction serves to support the floor of the carousel portion. Secured to and surrounding the beams $f$ is a collar $i'$. Mounted upon this collar is the revoluble member $i$, having a wheel-bearing, as shown in Fig. 2. This member $i'$ has imparted to it a circular motion from the gear-wheel $r$, to which it is attached, and refers said motion to the boats 1 and 2 by mechanism to be presently described. The gear-wheel may be suitably connected to the operating mechanism hereinbefore referred to. Extending outwardly from the member $i'$ are arms $j$, which form bearings for the angle-pieces $o$. Suitable tie-rods $l$ are interposed between the arms $j$ and the rod-plate $m$, which is provided with wheel-bearings and is secured to the center pole $e$. Referring to the angle-pieces $o$, they may be said to be right-angle members, of which one of their ends is pivoted at $o'$ and the other of their ends is free in order that the boats 1 and 2 may be connected thereto.

P is a circular track upon which the wheels $o^2$ of the angle-pieces travel. Attached to the angle-pieces are rollers $q$, adapted to track upon the supports $n$, which are carried by the members $k$, which in turn brace the arms $j$. This support has referred to it the resisting power of the boats, and the wheels $q$ being upon opposite sides of the support take up the strain upon both sides thereof.

The operation of the apparatus may be described as follows: Power being supplied from any suitable source to center pole $e$ and gear-wheel $r$, the revoluble members are set in motion, and reference will be only made to the lower portion, which is designated $b$. Assume boat 1, Fig. 2, to be upon the water in the channel *c*, where it will obviously float, and the boats 2 to have just left the channel where upon reaching the inclined trackway were caused to travel upon their respective wheels. Conversely, in Fig. 3 boat 2 is just leaving the incline and boats 1 are in the channel.

While the interior decoration and arrangement of the portion *b* has not been illustrated, obviously numerous combinations and effects may be utilized to advantage. The track may be undulating and different scenes and lighting effects may be shown, all of which is immaterial to the invention. In the circular travel of the boats use is made of cables *s*, which secure the boats to the angle-pieces *o* in the following manner: The cables are fastened to the boats and are led therefrom over pulleys, Fig. 2, and secured at or near the end of the angle-pieces *o*. This arrangement is important, since the movements of the boats are caused to respond more gradually to the different planes of the boats in their travel than if they were rigidly attached. In other words, the boats are practically free from jerks and the like by the described arrangement. The cables are so arranged that the boats are caused in rotation to be led by what may be termed a "straight" pull—this is, the center line of the boat, taken together with the cables which are secured to the ends of angle-pieces, form a straight line, and consequently the pull will be straight. In mounting the trackway the tendency of the boats is to incline to the plane thereof to the annoyance of passengers. However, owing to the fact of the pivoted connection of the angle-pieces this is eliminated. This pivoted connection will permit of the adapting of the boats to a substantially horizontal plane, as is illustrated in Fig. 3.

Among the many features of the described apparatus may be mentioned the arrangement of the operating mechanism for the boats. Arranged as shown, surrounding and attached to the center pole of the carousel, it affords a convenient, light, and durable method of operation without interfering with the arrangement of the carousel. The carousel may be utilized for two amusement devices without great expense, and one source of power will suffice for both. It presents an amusement apparatus of refinement and possesses educational advantages according to the decorations used. The boats are caused to retain substantially the normal position when mounting inclines.

It will be obvious to those skilled in the art to which the invention relates that modifications may be made in details without departing from the spirit and scope of same. Hence I do not limit myself to the precise construction and arrangement of parts hereinbefore described, and illustrated in the accompanying drawings; but, Having described the nature and objects of the invention, what I claim as new, and desire to secure by Letters Patent, is—

1. An amusement apparatus of the class recited comprising a center pole, a collar, a revoluble member suitably mounted thereon, a series of radial arms extending from the revoluble member, angle-pieces having rollers, said angle-pieces being pivotally connected to the ends of said arms, means for affording bearing-surfaces for the rollers, a plurality of conveyances connected to the angle-pieces and arranged to travel in an undulating, circular path, means for equalizing changes in the plane of said conveyances in respect to the undulating path, and means for propelling the conveyances, substantially as described.

2. An amusement apparatus of the class recited comprising a center pole, a collar, a revoluble member suitably mounted thereon, a series of radial arms extending from said member, braces mounted between the arms, roller-supports carried by the braces, a circular track surrounding the arms, angle-pieces carrying wheels and rollers, said angle-pieces being pivotally secured to the arms, a plurality of conveyances connected to the angle-pieces and arranged to travel in a circular course, comprising a body of water and an inclined path, apparatus for causing the conveyances to respond to changes in the plane of the said path and means for propelling the conveyances, substantially as described.

3. An amusement apparatus of the type specified comprising a plurality of boats provided with wheels adapted to travel in a circular course, said course consisting of water and inclined ways forming a track, a carousel and its center pole, stays for said pole, a collar mounted around said stays, a revoluble member on said collar, arms extending radially therefrom, braces mounted between the arms, roller-supports carried by the braces, angle-pieces pivotally connected to the arms, rollers journaled at or near the center of the angle-pieces and adapted to track upon the supports, traveling wheels mounted on the angle-pieces, a circular track for said wheels and means for propelling the boats, substantially as described.

4. An amusement apparatus of the type specified comprising a plurality of conveyances adapted to travel in a circular course, said course consisting of water and inclined ways, a center pole, stays for the pole, a collar mounted upon said stays, a revoluble member on said collar, arms extending radially therefrom, braces mounted between the arms, roller-supports carried by the braces, angle-pieces pivotally secured to the arms, rollers journaled to the angle-pieces and adapted to track upon the supports, traveling wheels mounted upon the angle-pieces, a circular track for the wheels and means for propelling the conveyances substantially as described.

5. An amusement apparatus of the type recited comprising a center pole, stays for the pole, a collar mounted upon said stays, a revoluble member on said collar, arms extending radially therefrom, braces mounted between the arms, roller-supports carried by the braces, angle-pieces pivotally secured to the arms, rollers journaled to the angle-pieces and adapted to travel upon the supports, traveling wheels and pulleys upon the angle-pieces, a plurality of conveyances, cables secured to said conveyances and passing over said pulleys on the angle-pieces and secured at or near the pivotal points of said angle-pieces and means for propelling the conveyances, substantially as described.

6. An amusement apparatus comprising a center pole, a collar mounted upon said pole, a revoluble member, arms extending radially therefrom, braces mounted between the arms, roller-supports carried by the braces, angle-pieces pivotally secured to the arms, rollers journaled to the angle-pieces and adapted to track upon the supports, traveling wheels and pulleys mounted upon the angle-pieces, a track for the said wheels, a plurality of conveyances having wheels, cables secured to said conveyances and passing over the pulleys on the angle-pieces and secured at or near the pivotal points of said angle-pieces and means for propelling the conveyances, substantially as described.

7. An amusement apparatus comprising a circular course consisting of water and inclined ways, a center pole, a collar, a revoluble member suitably mounted thereon, arms extending radially from said member, braces mounted between the arms, roller-supports carried by the braces, angle-pieces pivotally secured to the arms, rollers journaled to the angle-pieces and adapted to track upon the supports, traveling wheels for the angle-pieces, a plurality of conveyances, means between the conveyances and the angle-pieces for equalizing the horizontal plane of the conveyances when mounting the inclined ways and means for operating the conveyances, substantially as described.

In testimony whereof I have hereunto signed my name in the presence of two subscribed witnesses.

ALFRED F. MUELLER.

Witnesses:
W. J. JACKSON,
WILLIAM R. LIEDEKE.